United States Patent [19]

Cueman

[11] Patent Number: 4,728,768
[45] Date of Patent: Mar. 1, 1988

[54] PERCUSSION WELD MONITORING

[75] Inventor: Michael K. Cueman, Schenectady, N.Y.

[73] Assignee: General Electric Company, Schenectady, N.Y.

[21] Appl. No.: 63,941

[22] Filed: Jun. 19, 1987

[51] Int. Cl.⁴ ............................................. B23K 11/14
[52] U.S. Cl. ........................................ 219/96; 219/95; 219/109; 219/118; 219/130.01
[58] Field of Search .................. 219/95, 96, 113, 109, 219/118, 130.01

[56] References Cited

U.S. PATENT DOCUMENTS

| | | | |
|---|---|---|---|
| 3,127,595 | 3/1964 | Coyne | 219/95 |
| 3,239,646 | 3/1966 | Goode et al. | 219/109 |
| 3,433,921 | 3/1969 | Peterson | 219/110 |
| 4,609,806 | 9/1986 | Grabkowski et al. | 219/95 |

FOREIGN PATENT DOCUMENTS

| | | | |
|---|---|---|---|
| 2813260 | 10/1979 | Fed. Rep. of Germany | 219/109 |
| 332961 | 7/1972 | U.S.S.R. | 219/130.01 |

OTHER PUBLICATIONS

ASM Metals Handbook Eighth Edition, vol. 6, 1971, "Percussion Welding", pp. 177–186.
ASM Metals Handbook Ninth Edition, vol. 6, 1983, "Percussion Welding", pp. 739–745.

Primary Examiner—Clifford C. Shaw
Attorney, Agent, or Firm—Donald R. Campbell; James C. Davis, Jr.; Paul R. Webb, II

[57] ABSTRACT

The quality of a percussion weld is sensed by measuring and analyzing certain features of the weld current signature. Instantaneous current is measured by a Hall sensor and permits isolation of the welder from the monitoring system. Weld quality is strongly correlated to the time to vaporize the nib separating the parts, and the dwell time to forge the parts together after nib explosion. A weld is assumed defective if nib time is too short or dwell time is too long. These quality parameters may be supplemented by weld and forge timing, line voltage, and acoustic information; a weld is rejected if any of these are outside of acceptance limits. Experiments on the percussion welding of silver-cadmium oxide to brass show that cadmium-oxide is decomposed and expelled by the forge pressure and the joint is a silver to brass weld.

16 Claims, 5 Drawing Figures

FEATURES OF WELD CURRENT SIGNATURE

ANALYSIS OF WELD CURRENT SIGNATURE

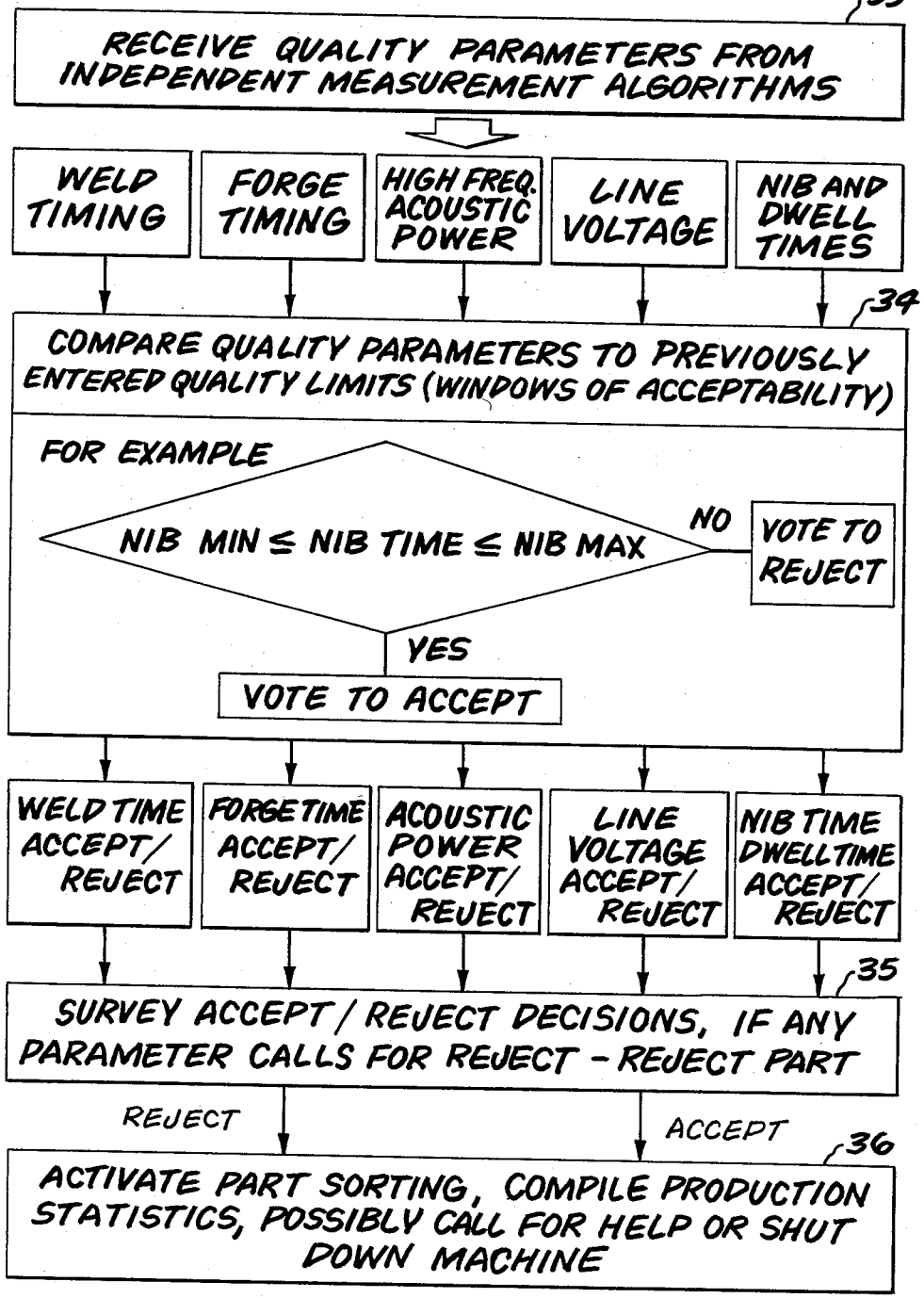

PERCUSSION WELD MONITORING

BACKGROUND OF THE INVENTION

This invention relates to an improved method and system for monitoring the quality of percussion welds.

The percussion weld process uses electric arc heating and physical impact to join difficult combinations of metals. For example, nominally unweldable silver-cadmium oxide relay contacts are attached to their brass supports by percussion welding. The process is subject to a number of poorly understood variables including changes in part contact resistance, factory line voltage fluctuations, and minute changes in the timing of the weld cycle. It was common for the human operator to judge defective welds based on his experience. Unattended production of consistent, reliable, welded parts requires an automated system which can monitor the process and reject suspect welds. Automatic welding, while potentially highly productive, can result in producing many unacceptable parts because the percussion process drifts. The scrap parts erode automation savings, and marginal welds shorten product life.

Prior attempts at detecting defective welds by analyzing information obtained during the weld event were not entirely successful. Among these are U.S. Pat. No. 3,433,921; the time-varying welding current is sensed and an unacceptable weld is indicated if the maximum current is high during the striking of the arc or falls below a given level just before extinguishment of the arc. U.S. Pat. No. 4,609,806 relates to acoustic monitoring of percussion weld quality and is one of the quality parameters used in the improved monitor of this invention.

SUMMARY OF THE INVENTION

An object of the invention is to provide an improved percussion weld monitor utilizing new measurements which provide a more robust test of weld quality.

Another object is to provide information of the welding process that can be used to adjust the welder and to specify the shape of the parts to be welded.

A still further object is improved percussion welding of silver-cadmium oxide to brass through an understanding of the chemical basis of the weld.

Percussion weld quality is determined reliably by measuring and analyzing the waveform of the electric current flowing through the workpieces during the weld event. This measurement is effectively implemented with a current sensor based on the Hall effect. Heretofore unrecognized features of the weld current signature are found to have a strong correlation to the quality of the percussion weld. These are the time necessary to vaporize and explode the small nib on one part which separates the parts to be welded, and the time to forge the parts together after the nib has vaporized. When either time is outside of quality limits, the weld is assumed defective; if the nib time is too short an insufficient amount of material is vaporized to prepare the surfaces for bonding and if the dwell time is too long the surfaces cool before they are united by the forge.

Accordingly, a method of monitoring percussion weld quality comprises sensing a weld current passed through parts to be welded, one having a nib or projection in contact with the other, as the parts are heated by the current and the nib explodes, and as forge pressure is applied to impact and unite the parts. The weld current waveform is analyzed and nib time is measured from start of the nib pulse to nib explosion, and dwell time from the latter until the parts are forged together. Weld quality is determined by comparing the nib and dwell times to preselected acceptance limits. Another feature of the invention is that said sensing comprises generating with a Hall effect sensor a signal proportional to instantaneous weld current. Time derivatives of the digitized signal are taken to yield start current, nib explosion, and forging times which are subtracted (the second from the first, and the third from the second).

Another aspect is that nib and dwell time measurements may be supplemented by measurements of other weld parameters that are fundamental to weld quality and determining if they are within quality limits, such as weld and forge timing, line voltage, and the acoustic signature of the weld event.

An improved percussion weld monitor to ascertain in real time the quality of welds produced on a percussion welding machine is yet another aspect of the invention. Means are provided to sense instantaneous weld current during the weld event, analyzing the current waveform and measuring nib pulse time and dwell interval, and comparing the two measured times to predetermined maximum and minimum values for satisfactory welds. Complete isolation of the monitoring system from the welder is obtained by using a Hall current sensor, as well as optical and transformer coupling of other complementary signals. The signal is provided to a computer where the time derivative of the current is taken in order to calculate nib and dwell time. Another feature of the monitor is that preferably it has means to measure and compare to quality limits the additional quality parameters already given. A welded assembly is rejected if nib or dwell time or any of those weld parameters is outside a window of acceptability.

An improved understanding of the chemical basis of the percussion weld of a silver-cadmium oxide part to another part, such as brass, leads to higher quality welds. It has been found that the heat of the plasma eliminates cadmium oxide in the weld zone. Cadmium oxide in a shallow layer of the part is decomposed by the heat and is expelled upon application of forge pressure to unite the parts. The joint at the interface with a brass part is a reliable silver-brass weld.

BRIEF DESCRIPTION OF THE DRAWINGS

FIG. 5 is a flowchart of the complete weld quality algorithm where the nib and dwell time parameters are supplemented by other quality parameters.

DETAILED DESCRIPTION OF THE INVENTION

Figure 1:
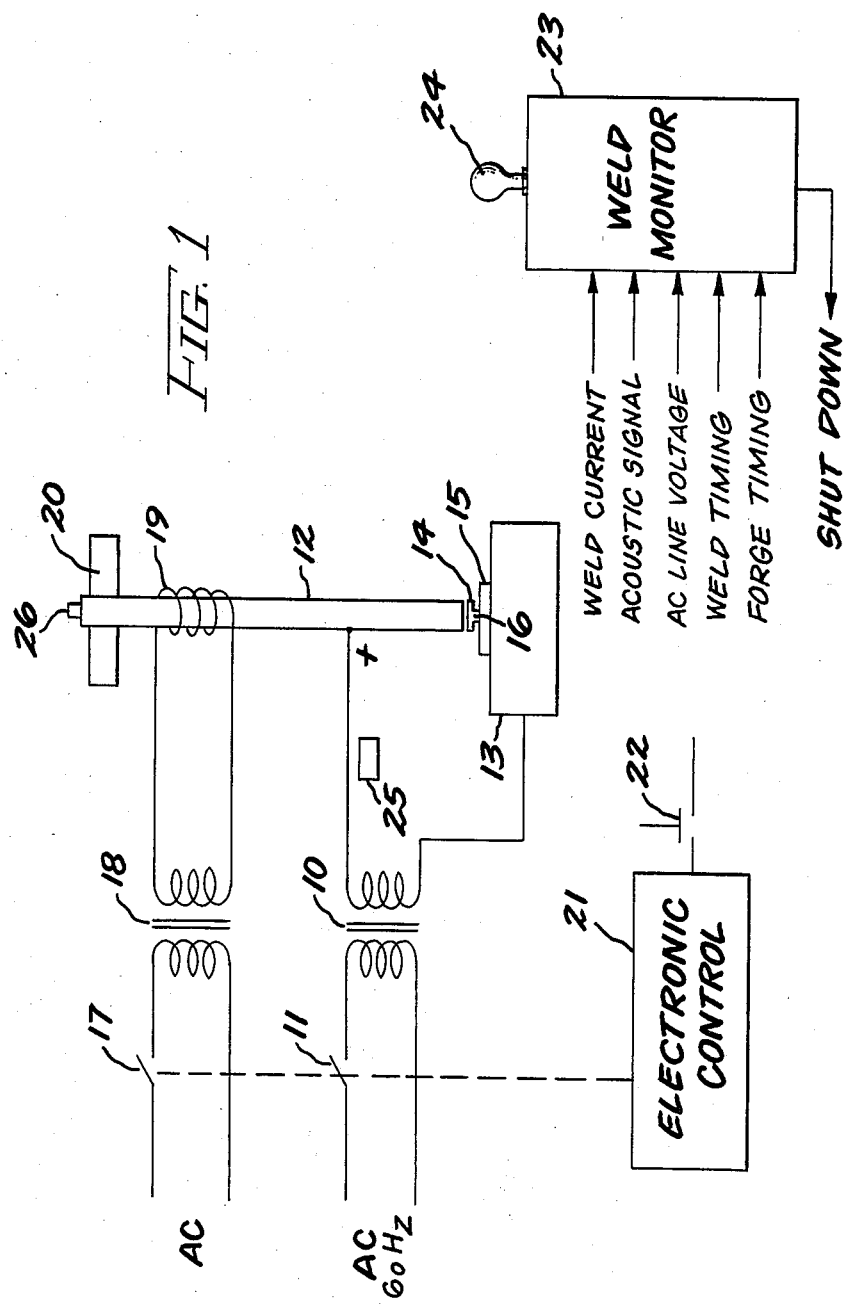
FIG. 1 is a simplified diagram of a percussion welding machine and the weld monitor of this invention.

The percussion welding machine in FIG. 1 is illustrative of one welder with which the percussion weld monitor and weld quality assurance method of this invention may be used. This magnetic force percussion welding machine runs synchronously with the AC line, and the weld is made during the first half cycle of current flow of a 60 Hz alternating current. The magnitude of the welding force is controlled by a separate transformer and can be varied without affecting the welding current. The primary winding of a weld transformer 10 is connected across a 440 volt AC line through an ignitron 11 shown as a simple switch. The secondary winding of weld transformer 10 is connected to a forge rod 12 and a copper anvil 13, and at the start of the weld event the path for welding current is completed through the two parts 14 and 15 to the welded, one of which has a small arc-starting nib 16 in contact with the other part. The nib typically has a diameter of 1 mm or so and a height to give the desired separation between the parts at the start of the weld. Weld transformer 10 steps down the voltage to about 20–40 volts and steps up the current; the welding current may be 50K amps.

Another ignitron 17 controls the application of power to the forge transformer 18. A high amperage current is fed to the windings 19 of an electromagnet, and a powerful magnetic force attracts a disk 20 fastened to the upper end of the forge rod 12 to apply forge pressure to the parts at the proper time in the weld cycle. An electronic control 21 supplies signals to initiate conduction of ignitrons 11 and 17 and otherwise control the percussion welder. The start of the welding cycle may be controlled manually by a push button 22.

Figure 2:
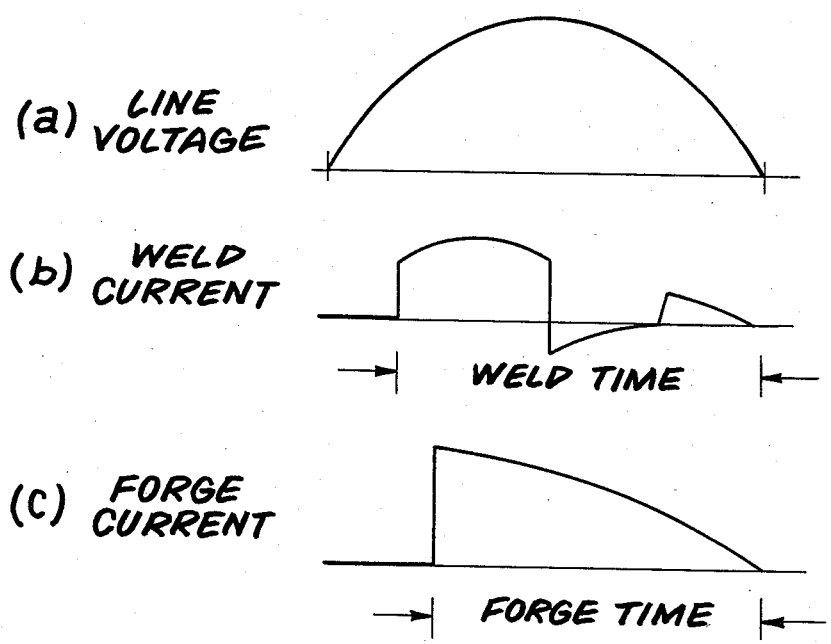
FIG. 2 shows a half cycle of the AC line voltage and the welding and forge current waveforms.
Figure 3:
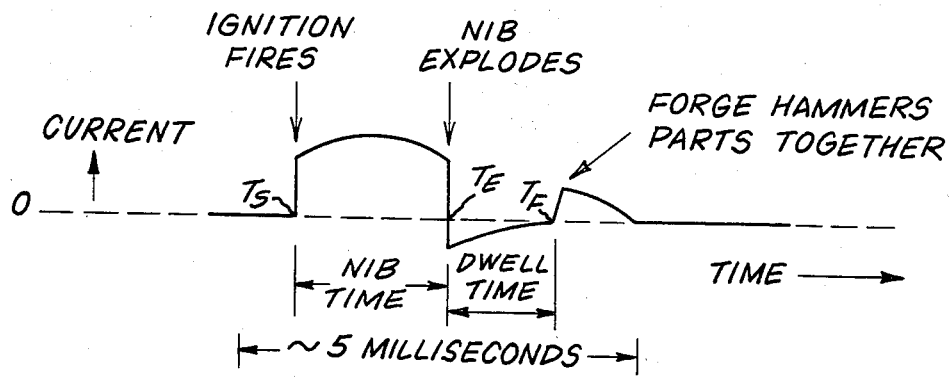
FIG. 3 illustrates the weld current signature and features that have a strong correlation to good weld quality.

Referring to the voltage and current waveforms in FIG. 2, line (a) shows a half cycle of the 60 Hz sinusoidal line voltage; the time duration of the half wave is 8 milliseconds. Line (b) shows a typical weld current waveform. The AC phase at which ignitron 11 is fired depends on the desired percentage of total power. At the start the weld current rises rapidly and flows through the two parts 14 and 15 and the arc-starting nib 16 separating them. The parts are heated and in about 2 milliseconds the nib explodes and the arc spreads across the gap. The weld current rapidly decreases and in fact the current in the inductive circuit goes negative because of the collapsing field in the transformer. The weld current rises toward zero until the application of forge pressure to the parts by forge rod 12 to impact and unite the parts. At this point the weld current increases rapidly to a second peak and drops to zero as the line voltage reverses and the ignitron turns off. Certain features of the weld current signature have a strong correlation to weld quality and are discussed later (FIG. 3).

The forge current shown in line (c) rises rapidly when ignitron 17 is turned on and then decays toward zero. Because it takes time to develop magnetic force and because of the inertia of the system, ignitron 17 is fired only shortly after ignitron 11. Forge time is measured from start to end of the forge current pulse, and weld time is measured from the start of weld current to the end of the current pulse.

The percussion weld monitor 23 in FIG. 1 determines the quality of the weld immediately after it is completed. An unsatisfactory weld may cause the welder to shut down or to turn on a red warning light 24 to indicate a malfunction and that help may be needed. The monitor is an addition to the percussion welding machine, which may be the Teledyne Precision-Cincinnati percussion welder or another commercially available machine. The method of supplying welding force, whether by an electromagnet, gravity, a cam-actuated direct drive, or a spring, is immaterial to this invention.

The primary sensor used in the quality monitor system is a Hall effect device. The Hall sensor produces a voltage proportional to the instantaneous magnetic field passing through it. When a Hall sensor is placed close to a wire carrying a large current, the field penetrating the device is proportional to the current in the wire. Thus, for fixed geometry, the sensor voltage is proportional to the instantaneous current in the wire. In this system, a Hall current sensor 25 is mounted on the insulation of a bus bar which delivers the high amperage weld current to the workpieces. It produces a voltage waveform that is directly proportional to the instantaneous current flowing through the workpieces during the weld event. This measurement technique has two fundamental advantages. First, it measures the weld current through its magnetic field, so no electrical contact with the welder itself is required. This permits total isolation, both signal and ground, of the measurement system from the electrically noisy welder. Second, it provides a direct, broad frequency, current measurement which extends all the way to direct current. It eliminates the need for digital integration techniques required to approximate the same results from transformer coupling schemes.

The instantaneous weld current measurement may be supplemented by measurements of other parameters fundamental to weld quality. The measured signals include, first, the instantaneous line voltage driving the welder. This signal is used to derive both the absolute power available to the machine and to establish power line phase. Knowledge of the average voltage during the weld event is needed in those locations, such as Puerto Rico, where voltage fluctuations could cause poor quality welds. Second, the timing of the weld current and forge events, both in an absolute sense and relative to each other and the AC power line which drives the welder. Third, the acoustic noise generated by the weld event. This is described in U.S. Pat. No. 4,609,806, Grabkowski, Schulz, and Williamson, "Method and Apparatus for Determining Weld Quality in Percussion Welding", the disclosure of which is incorporated herein by reference. The vibration signal produced during the weld event is sensed, the damping characteristics of the signal are measured, and this is compared with a reference to determine the quality of the weld.

The vibrations generated during the weld cycle, and particularly by the forge event, are conveniently sensed by an accelerometer 26 attached to the top of forge rod 12. The other measurements, weld time and phase, forge time and phase, and line voltage are readily obtained from electronic control 21 or by straight forward electronic circuits known to those skilled in the art. These five measurements are the inputs to weld monitor 23 depicted by the arrows in FIG. 1. These circuits pass through optical isolation stages which insure the separation of both signals and grounds between the welder and its monitor.

To elaborate on the measurement technique, during the weld event the signals mentioned above are collected by a small dedicated computer in weld monitor 23. The weld current and acoustic signatures are processed by an analog-to-digital converter and rapidly stored as numerical arrays in the computer memory. For noise immunity, all sensor inputs are either physically or optically isolated from the larger hardware. Signal lines are never common with welder power. Welder and monitor grounds are kept separate except for a single common tie at the chassis.

A weld current signature, such as is sensed during the percussion welding of silver-cadmium oxide and brass relay switch contacts, is shown to an enlarged scale in FIG. 3. Several features of the current waveform, identified by experiment, are found to have a strong correlation to good weld quality. The times of the zero crossings of the signal labeled $T_S$, $T_E$, and $T_F$ are used to calculate time intervals which permit the quality evaluation of the weld process. Time $T_S$ marks the start of the weld when the ignitron fires and there is a rapid increase in weld current; $T_E$ is at nib explosion and the passage through zero of the rapidly decreasing weld current; and $T_F$ marks the rapid increase of weld current to a second, smaller peak at the application of forge pressure as the forge hammers the parts together. The quality of the weld is strongly correlated to: (1) the time necessary to vaporize the small nib of metal 16 which separates the parts 14 and 15 to be welded, and (2) the time required to forge the parts together after the nib has vaporized. The time to vaporize the nib is the duration of the first hump or peak in the weld current signature. It can be calculated as $T_E$ minus $T_S$. Similarly the time between the destruction of the nib and the joining of the surfaces by the impact of the forge action can be expressed as a dwell time equal to $T_F$ minus $T_E$.

A weld is assumed to be defective if either its nib pulse time is too short or its dwell interval is too long. If the nib is destroyed too quickly, an insufficient amount of material is vaporized to prepare the surfaces for bonding. If the dwell time is too long, the heated surfaces cool before they are united by the forge. Anomalous "dud" welds never destroy the nib and produce a smooth hump waveform without the telltale dwell interval.

Figure 4:
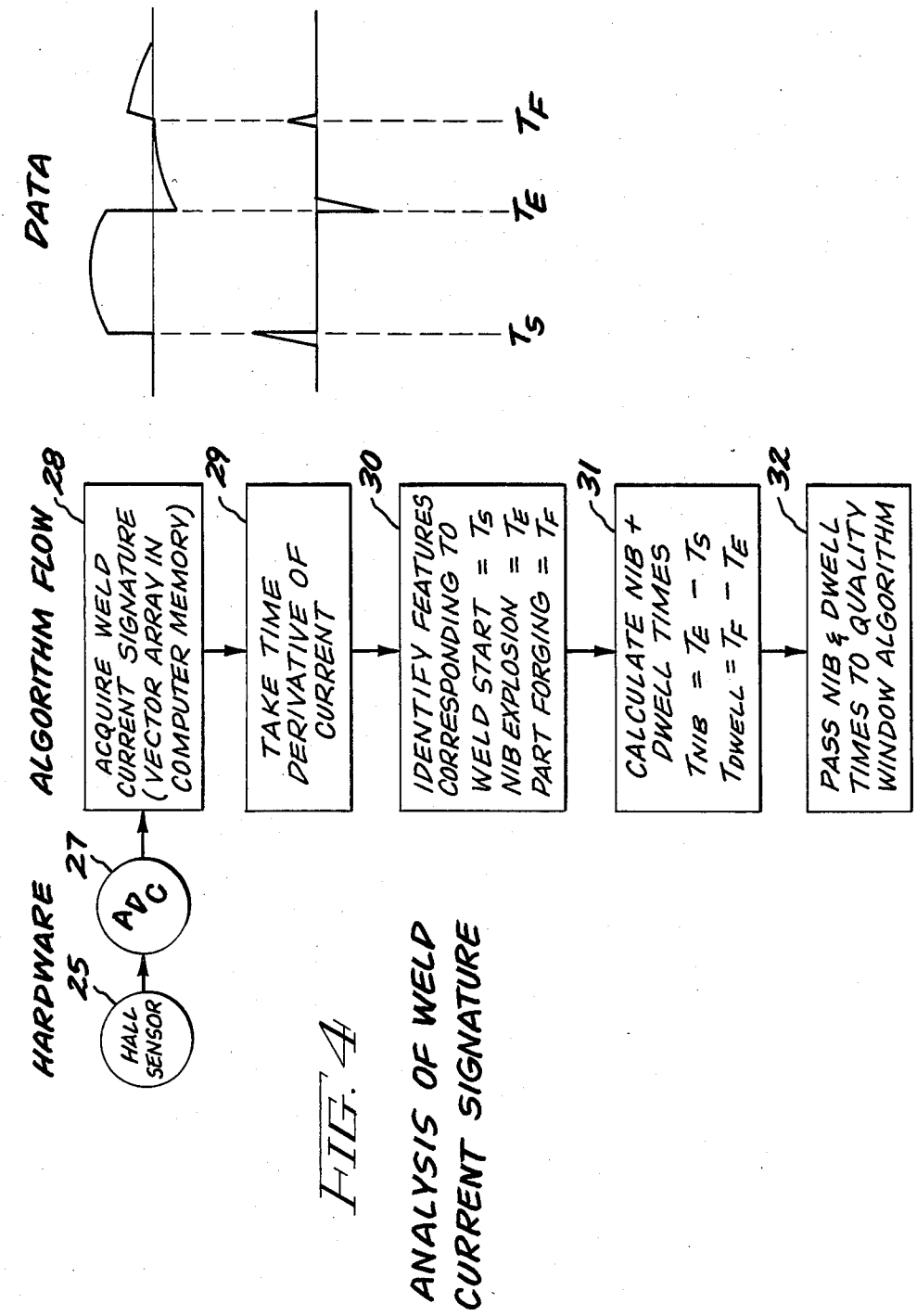
FIG. 4 is a flowchart of analysis of the weld current by the monitor's computer.

The weld current signature is analyzed and nib and dwell times calculated by the computer software as shown in FIG. 4. The hardware components are the Hall current sensor 25 and analog-to-digital converter 27. The flowchart of an algorithm to determine the nib and dwell times is given in blocks 28–32. Referring also to the data diagram at the right, the weld current signature is acquired and stored as a vector array in computer memory. The time derivative of the current is taken; there are peaks in the time derivative at times corresponding to the rapid increase and decrease of weld current at the start and end of the nib pulse and at the rapid increase of current to a second, smaller peak upon the application of forge force to impact the parts and unite the heated surfaces which have been melted by arc heating. The features of the weld current signature corresponding to weld start, $T_S$, nib explosion, $T_E$, and part forging, $T_F$, are identified. Nib and dwell times are calculated by subtracting $T_S$ from $T_E$, and subtracting $T_E$ from $T_F$. The nib and dwell times are then passed to a quality window algorithm where each is compared to maximum and minimum values of acceptable times for a satisfactory weld. The welded assembly is rejected either nib or dwell time is outside of its window of acceptability.

These easily calculated times are used by the process monitor 23 to accept or reject parts. An engineer can tune the welding apparatus by watching these parameters as the weld controls are adjusted. Process changes which tend to increase the nib time or reduce the dwell time generally improve the weld quality. Using experimental data, the nib 16 can be designed and its diameter and height selected to enhance weld reliability.

Improved welding of silver-cadmium oxide to brass or another metal through the use of this percussion welding process has been noted and verified by scanning electron microprobe studies. It is believed that the chemical basis of these welds had not been fully understood until now. Cadmium oxide (CdO) makes silver difficult to weld. It has been explained that the parts and nib are heated by the nib current pulse and the nib gets hot and explodes as the electric arc heats adjacent surfaces of the parts. A plasma of ionized metal fills the area between the parts and expands outward. The plasma heats and cleans the surfaces, and its extreme heat decomposes cadmium oxide from a shallow layer of the part to Cd and O. The Cd is blown out and expelled from between the parts because of its high vapor pressure and low melting point. As forge pressure is applied to extinguish the arc and impact and unite the parts, the plasma is expelled from between the parts and cadmium oxide is deposited on one part, outside the weld zone, as black CdO. The joint between the parts is actually a silver-brass weld; silver can be reliably and easily welded to brass and makes a strong joint.

The overall quality algorithm running in the monitor computer is diagrammed in FIG. 5. The main steps of the procedure are shown in blocks 33–36. The quality parameters are received from the independent measurement algorithms, namely weld timing, forge timing, high frequency acoustic power, line voltage, and nib and dwell times. Each quality parameter is compared to previously determined and entered upper and lower quality limits. These limits define each parameter's window of acceptability. For example, if the measured nib time is between its minimum and maximum values, there is a vote to accept the weld; if not there is a vote to reject. All of the quality parameters are compared to the quality limits and there is a vote to accept or reject. A survey of these decisions is made and the welded assembly is rejected if any parameter is outside of the acceptable limits. The reject or accept decision can be employed to activate part sorting, compile production statistics, and possibly turn on the red warning light to call for help, or shut down the machine. The weld engineer uses process experience to establish the maximum and minimum values for each of the quality parameters calculated by the process monitor.

While the invention has been particularly shown and described with reference to preferred embodiments thereof, it will be understood by those skilled in the art that various changes in form and details may be made without departing from the spirit and scope of the invention.

The invention claimed is:

1. A method of monitoring the quality of percussion welds made on a percussion welding machine comprising:

sensing a weld current passed through parts to be welded, one of which has a nib in contact with the other, as said parts are heated and said nib explodes, and as forge pressure is applied to impact and unite said parts;

measuring nib time from the start of said weld current to nib explosion and dwell time from the nib explosion until said parts are forged together; and determining weld quality by comparing said nib and dwell times to preselected acceptance limits.

2. The method of claim 1 wherein a welded assembly is accepted when said nib and dwell times are both between upper and lower limits.

3. The method of claim 1 further comprising rejecting a welded assembly whose nib time is too short and less than a lower limit, or whose dwell time is too long and above an upper limit.

4. The method of claim 1 wherein said sensing comprises generating with a Hall effect sensor a signal proportional to instantaneous weld current.

5. The method of claim 4 wherein said weld current signal is digitized and time derivatives taken to yield start current, nib explosion, and part forging times which are subtracted to give said nib and dwell times.

6. The method of claim 1 further comprising supplementing said nib and dwell time measurements by measuring other weld parameters fundamental to weld quality and determining whether these parameters are within quality limits.

7. The method of claim 6 wherein said other weld paramaters include weld timing from start to end of a weld current pulse, forge timing from start to end of a forge current pulse, and the foregoing are supplemented by analyzing vibration signals and the acoustic signature of the weld event.

8. The method of claim 7 further comprising measuring the AC line voltage fed to and driving said percussion welding machine and rejecting a welded assembly where average voltage during the weld event is outside of acceptable limits.

9. An improved method of monitoring the quality of the percussion weld of a silver-cadmium oxide part to a second part, comprising:
sensing the instantaneous weld current fed to said parts, one of which has a nib in contact with the other, as a nib current pulse heats said parts and explodes said nib, and as a plasma forms and cadmium oxide in a shallow layer of the first-mentioned part is decomposed and expelled upon application of forge pressure to impact and unite said parts,
analyzing said weld current and measuring nib time from the start of said nib pulse to a rapid decrease in current at nib explosion, and dwell time from nib explosion to a rapid increase in current to a second peak as said parts are forged together; and
comparing said nib and dwell times to predetermined upper and lower limits for acceptable welds.

10. The method of claim 9 wherein said second part is brass and the joint between said parts is a silver-brass weld.

11. The method of claim 9 further comprising supplementing said nib and dwell time measurements with measurements of other weld parameters that are fundamental to weld quality, and determining whether these other parameters are within quality limits.

12. A percussion weld monitor for determining the quality of welds produced on a percussion welding machine which has means to supply a weld current pulse and forge force to parts to be welded, one part having a nib in contact with the second part, said monitor comprising:
means for sensing the instantaneous weld current as a nib pulse is applied to heat said parts and explode said nib, and during a dwell interval before joining of the heated surfaces by impact of the forge force;
means for analyzing the weld current waveform and measuring nib pulse time and said dwell interval;
and means for comparing said nib time and dwell interval to predetermined maximum and minimum values of acceptable welds.

13. The weld monitor of claim 12 wherein said sensing means is a Hall effect device that generates a voltage proportional to instantaneous current.

14. The weld monitor of claim 13 wherein said analyzing means is comprised of means for taking the time derivative of said weld current to yield weld start, nib explosion, and part forging times, and means for subtracting the second from the first and third from the second to yield said nib time and dwell interval.

15. The weld monitor of claim 12 further comprising means for indicating rejection of any welded assembly outside of said acceptable values of nib time and dwell interval.

16. The weld monitor of claim 15 further comprising means for measuring other percussion weld quality parameters such weld timing and forge timing, and the acoustic signature of the weld event, means for comparing said other parameters to quality limits, and means for rejecting any welded assembly outside of said limits.

* * * * *